United States Patent
Hirokawa

(10) Patent No.: US 9,888,131 B2
(45) Date of Patent: Feb. 6, 2018

(54) IMAGE PROCESSING APPARATUS, CONTROLLING METHOD, AND RECORDING MEDIUM STORING CONTROLLING PROGRAM

(71) Applicant: Tatsuma Hirokawa, Kanagawa (JP)

(72) Inventor: Tatsuma Hirokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 3 days.

(21) Appl. No.: 15/263,725

(22) Filed: Sep. 13, 2016

(65) Prior Publication Data

US 2017/0078498 A1 Mar. 16, 2017

(30) Foreign Application Priority Data

Sep. 15, 2015 (JP) .................................. 2015-181303

(51) Int. Cl.
| | |
|---|---|
| *H04N 1/00* | (2006.01) |
| *H04N 1/04* | (2006.01) |
| *G06F 3/12* | (2006.01) |
| *H04N 1/32* | (2006.01) |

(52) U.S. Cl.
CPC ....... *H04N 1/00095* (2013.01); *G06F 3/1203* (2013.01); *G06F 3/1211* (2013.01); *H04N 1/00411* (2013.01); *H04N 1/0461* (2013.01); *H04N 1/32363* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,421,136 B2 * | 7/2002 | Yamamoto | ........... | H04N 1/0035 |
| | | | | 358/1.15 |
| 6,804,336 B2 * | 10/2004 | Chiu | ..................... | H04L 51/066 |
| | | | | 358/440 |

(Continued)

FOREIGN PATENT DOCUMENTS

| | | |
|---|---|---|
| JP | 2003-016004 | 1/2003 |
| JP | 2006-148882 | 6/2006 |

(Continued)

*Primary Examiner* — Thomas D Lee
(74) *Attorney, Agent, or Firm* — Oblon, McClelland, Maier & Neustadt, L.L.P.

(57) ABSTRACT

An image processing apparatus includes a memory that stores configuration information indicating one or more conditions for automatically setting a preregistered destination as a transmission destination of the image data, circuitry that, in response to receiving a user instruction for transmitting image data to a destination configured by a user, determines whether or not the configured destination satisfies at least one of the conditions indicated by the configuration information and configures the preregistered destination as a transmission destination of the image data in addition to the configured destination based on a determination indicating that the configured destination satisfies the predetermined condition, the preregistered destination being prohibited from modification by the user, and a transmitter that transmits the image data to the configured destination and the preregistered destination.

11 Claims, 13 Drawing Sheets

(56) References Cited

U.S. PATENT DOCUMENTS

| | | | | |
|---|---|---|---|---|
| 2009/0279134 | A1* | 11/2009 | Fujii | H04N 1/00244 358/1.15 |
| 2011/0019229 | A1 | 1/2011 | Hayashi et al. | |
| 2013/0128313 | A1 | 5/2013 | Hirokawa et al. | |
| 2014/0380430 | A1* | 12/2014 | Takamiya | H04L 63/0876 726/4 |
| 2015/0186935 | A1 | 7/2015 | Hirokawa | |
| 2015/0278643 | A1 | 10/2015 | Hirokawa | |

FOREIGN PATENT DOCUMENTS

| | | |
|---|---|---|
| JP | 2011-029708 | 2/2011 |
| JP | 2011-034464 | 2/2011 |
| JP | 2014-064337 | 4/2014 |

* cited by examiner

FIG. 3A

ADMINISTRATOR SETTINGS SCREEN

SET MAIL DESTINATION AUTOMATICALLY 52

- ○ NO
- ◉ YES

DESTINATION SET AUTOMATICALLY 54

- ☑ DESTINATION OF LOGIN USER [To]
- ☐ DESTINATION OF ADMINISTRATOR [Cc]
- ☐ OPTIONAL DESTINATION : xx@x.co.jp [To]

CONDITION OF SETTING AUTOMATICALLY 56

- ◉ SET AUTOMATICALLY ALWAYS
- ○ SET AUTOMATICALLY IF CONDITION BELOW IS SATISFIED
  - ☐ IF DESTINATION OTHER THAN LOGIN USER IS INCLUDED
  - ☐ IF DESTINATION OUTSIDE CORPORATION IS INCLUDED
  - ☐ IF DESTINATION UNREGISTERED IN ADDRESS BOOK IS INCLUDED
  - ☐ IF DESTINATION OTHER THAN OPTIONAL ADDRESS IS INCLUDED : yy@y.co.jp, zz@z.co.jp

MODIFY DESTINATION 58

- ○ ALL DESTINATIONS ARE UNMODIFIABLE
- ○ ALL DESTINATIONS ARE MODIFIABLE
- ◉ ONLY DESTINATION SET AUTOMATICALLY IS UNMODIFIABLE

FIG. 3B

| SET DESTINATION AUTOMATICALLY | ON | | | |
|---|---|---|---|---|
| DESTINATIONS SET AUTOMATICALLY | ON | LOGIN USER [To] | | |
| | OFF | ADMINISTRATOR [Cc] | | |
| | OFF | OPTIONAL DESTINATION [To] | ADDRESS | xx@x.co.jp |
| SET CONDITIONS AUTOMATICALLY | ON | | | |
| CONDITION OF SETTING AUTOMATICALLY | OFF | DESTINATION OTHER THAN LOGIN USER IS INCLUDED | | |
| | OFF | DESTINATION OUTSIDE CORPORATION IS INCLUDED | | |
| | OFF | DESTINATION UNREGISTERED IN ADDRESS BOOK IS INCLUDED | | |
| | OFF | DESTINATION OTHER THAN OPTIONAL ADDRESS IS INCLUDED | ADDRESS | yy@y.co.jp, zz@z.co.jp |
| MODIFY DESTINATION | OFF | ALL DESTINATIONS ARE UNMODIFIABLE | | |
| | OFF | ALL DESTINATIONS ARE MODIFIABLE | | |
| | ON | ONLY DESTINATION SET AUTOMATICALLY IS UNMODIFIABLE | | |

FIG. 5A

ADMINISTRATOR SETTINGS SCREEN

SET MAIL DESTINATION AUTOMATICALLY   52

- ● NO
- ○ YES

DESTINATION SET AUTOMATICALLY   54

- ☐ DESTINATION OF LOGIN USER [To]
- ☐ DESTINATION OF ADMINISTRATOR [Cc]
- ☐ OPTIONAL DESTINATION : xx@x.co.jp [To]

CONDITION OF SETTING AUTOMATICALLY   56

- ○ SET AUTOMATICALLY ALWAYS
- ○ SET AUTOMATICALLY IF CONDITION BELOW IS SATISFIED
  - ☐ IF DESTINATION OTHER THAN LOGIN USER IS INCLUDED
  - ☐ IF DESTINATION OUTSIDE CORPORATION IS INCLUDED
  - ☐ IF DESTINATION UNREGISTERED IN ADDRESS BOOK IS INCLUDED
  - ☐ IF DESTINATION OTHER THAN OPTIONAL ADDRESS IS INCLUDED : yy@y.co.jp, zz@z.co.jp

MODIFY DESTINATION   58

- ○ ALL DESTINATIONS ARE UNMODIFIABLE
- ○ ALL DESTINATIONS ARE MODIFIABLE
- ○ ONLY DESTINATION SET AUTOMATICALLY IS UNMODIFIABLE

FIG. 5B

Scan to E-mail CONFIGURATION SCREEN

MAIL DESTINATION   72

| PLEASE INPUT DESTINATION |

SCANNING SETTINGS

| COLOR SETTING<br>FULL COLOR | FILE SETTING<br>PDF | RESOLUTION<br>200 dpi | DOCUMENT SURFACE<br>DUPLEX |

FIG. 6A

ADMINISTRATOR SETTINGS SCREEN

SET MAIL DESTINATION AUTOMATICALLY
- ○ NO
- ◉ YES

DESTINATION SET AUTOMATICALLY
- ☑ DESTINATION OF LOGIN USER [To]
- ☐ DESTINATION OF ADMINISTRATOR [Cc]
- ☐ OPTIONAL DESTINATION : xx@x.co.jp [To]

CONDITION OF SETTING AUTOMATICALLY
- ◉ SET AUTOMATICALLY ALWAYS
- ○ SET AUTOMATICALLY IF CONDITION BELOW IS SATISFIED
  - ☐ IF DESTINATION OTHER THAN LOGIN USER IS INCLUDED
  - ☐ IF DESTINATION OUTSIDE CORPORATION IS INCLUDED
  - ☐ IF DESTINATION UNREGISTERED IN ADDRESS BOOK IS INCLUDED
  - ☐ IF DESTINATION OTHER THAN OPTIONAL ADDRESS IS INCLUDED : yy@y.co.jp, zz@z.co.jp

MODIFY DESTINATION
- ○ ALL DESTINATIONS ARE UNMODIFIABLE
- ◉ ALL DESTINATIONS ARE MODIFIABLE
- ○ ONLY DESTINATION SET AUTOMATICALLY IS UNMODIFIABLE

FIG. 6B

Scan to E-mail CONFIGURATION SCREEN

MAIL DESTINATION

| USER DESTINATION (user@x.co.jp) [To] | *MODIFIABLE |

SCANNING SETTINGS

| COLOR SETTING FULL COLOR | FILE SETTING PDF | RESOLUTION 200 dpi | DOCUMENT SURFACE DUPLEX |

ADMINISTRATOR SETTINGS SCREEN

SET MAIL DESTINATION AUTOMATICALLY 52

- ○ NO
- ◉ YES

DESTINATION SET AUTOMATICALLY 54

- ☑ DESTINATION OF LOGIN USER [To]
- ☐ DESTINATION OF ADMINISTRATOR [Cc]
- ☐ OPTIONAL DESTINATION : xx@x.co.jp [To]

CONDITION OF SETTING AUTOMATICALLY 56

- ◉ SET AUTOMATICALLY ALWAYS
- ○ SET AUTOMATICALLY IF CONDITION BELOW IS SATISFIED
  - ☐ IF DESTINATION OTHER THAN LOGIN USER IS INCLUDED
  - ☐ IF DESTINATION OUTSIDE CORPORATION IS INCLUDED
  - ☐ IF DESTINATION UNREGISTERED IN ADDRESS BOOK IS INCLUDED
  - ☐ IF DESTINATION OTHER THAN OPTIONAL ADDRESS IS INCLUDED : yy@y.co.jp, zz@z.co.jp

MODIFY DESTINATION 58

- ◉ ALL DESTINATIONS ARE UNMODIFIABLE
- ○ ALL DESTINATIONS ARE MODIFIABLE
- ○ ONLY DESTINATION SET AUTOMATICALLY IS UNMODIFIABLE

Scan to E-mail CONFIGURATION SCREEN

MAIL DESTINATION 72

USER DESTINATION (user@x.co.jp) [To]     *UNMODIFIABLE

SCANNING SETTINGS

| COLOR SETTING<br>FULL COLOR | FILE SETTING<br>PDF | RESOLUTION<br>200 dpi | DOCUMENT SURFACE<br>DUPLEX |

FIG. 8A

ADMINISTRATOR SETTINGS SCREEN — 50

SET MAIL DESTINATION AUTOMATICALLY — 52
- ○ NO
- ◉ YES

DESTINATION SET AUTOMATICALLY — 54
- ☐ DESTINATION OF LOGIN USER [To]
- ☑ DESTINATION OF ADMINISTRATOR [Cc]
- ☐ OPTIONAL DESTINATION : xx@x.co.jp [To]

CONDITION OF SETTING AUTOMATICALLY — 56
- ○ SET AUTOMATICALLY ALWAYS
- ◉ SET AUTOMATICALLY IF CONDITION BELOW IS SATISFIED
  - ☐ IF DESTINATION OTHER THAN LOGIN USER IS INCLUDED
  - ☑ IF DESTINATION OUTSIDE CORPORATION IS INCLUDED
  - ☐ IF DESTINATION UNREGISTERED IN ADDRESS BOOK IS INCLUDED
  - ☐ IF DESTINATION OTHER THAN OPTIONAL ADDRESS IS INCLUDED : yy@y.co.jp, zz@z.co.jp

MODIFY DESTINATION — 58
- ○ ALL DESTINATIONS ARE UNMODIFIABLE
- ○ ALL DESTINATIONS ARE MODIFIABLE
- ◉ ONLY DESTINATION SET AUTOMATICALLY IS UNMODIFIABLE

FIG. 8B

Scan to E-mail CONFIGURATION SCREEN — 70

MAIL DESTINATION — 72
- PLEASE INPUT DESTINATION

SCANNING SETTINGS
| COLOR SETTING | FILE SETTING | RESOLUTION | DOCUMENT SURFACE |
| --- | --- | --- | --- |
| FULL COLOR | PDF | 200 dpi | DUPLEX |

IMAGE PROCESSING APPARATUS, CONTROLLING METHOD, AND RECORDING MEDIUM STORING CONTROLLING PROGRAM

CROSS-REFERENCE TO RELATED APPLICATION

This patent application is based on and claims priority pursuant to 35 U.S.C. § 119(a) to Japanese Patent Application No. 2015-181303, filed on Sep. 15, 2015 in the Japan Patent Office, the entire disclosure of which is hereby incorporated by reference herein.

BACKGROUND

Technical Field

The present invention relates to an image processing apparatus, a controlling method, and a non-transitory recording medium storing a controlling program.

Background Art

The recent network-based image forming apparatuses such as multifunction peripherals (MFPs), are capable of transferring a scanned image to a specified destination via a network. However, if users are allowed to transfer images to any destination unlimitedly, it would be difficult to prevent information from leaking.

In this regard, there is an image transfer apparatus that automatically and forcibly adds an administrator (e.g., a group leader etc.) to the destination when scanning and transferring an image to the destination, to prevent confidential information from being transferred secretly.

SUMMARY

Example embodiments of the present invention provide a novel image processing apparatus includes a memory that stores configuration information indicating one or more conditions for automatically setting a preregistered destination as a transmission destination of the image data, circuitry that, in response to receiving a user instruction for transmitting image data to a destination configured by a user, determines whether or not the configured destination satisfies at least one of the conditions indicated by the configuration information and configures the preregistered destination as a transmission destination of the image data in addition to the configured destination based on a determination indicating that the configured destination satisfies the predetermined condition, the preregistered destination being prohibited from modification by the user, and a transmitter that transmits the image data to the configured destination and the preregistered destination.

Further example embodiments of the present invention provide a method of controlling the image forming apparatus and a non-transitory recording medium storing a controlling program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIGS. 3A and 3B are diagrams illustrating an administrator settings screen as an embodiment of the present invention.

FIGS. 5A and 5B are diagrams illustrating an administrator settings screen and a job configuration screen as an embodiment of the present invention.

FIGS. 6A and 6B are diagrams illustrating an administrator settings screen and a job configuration screen as an embodiment of the present invention.

FIGS. 7A and 7B are diagrams illustrating an administrator settings screen and a job configuration screen as an embodiment of the present invention.

FIGS. 8A and 8B are diagrams illustrating an administrator settings screen and a job configuration screen as an embodiment of the present invention.

Figure 1:
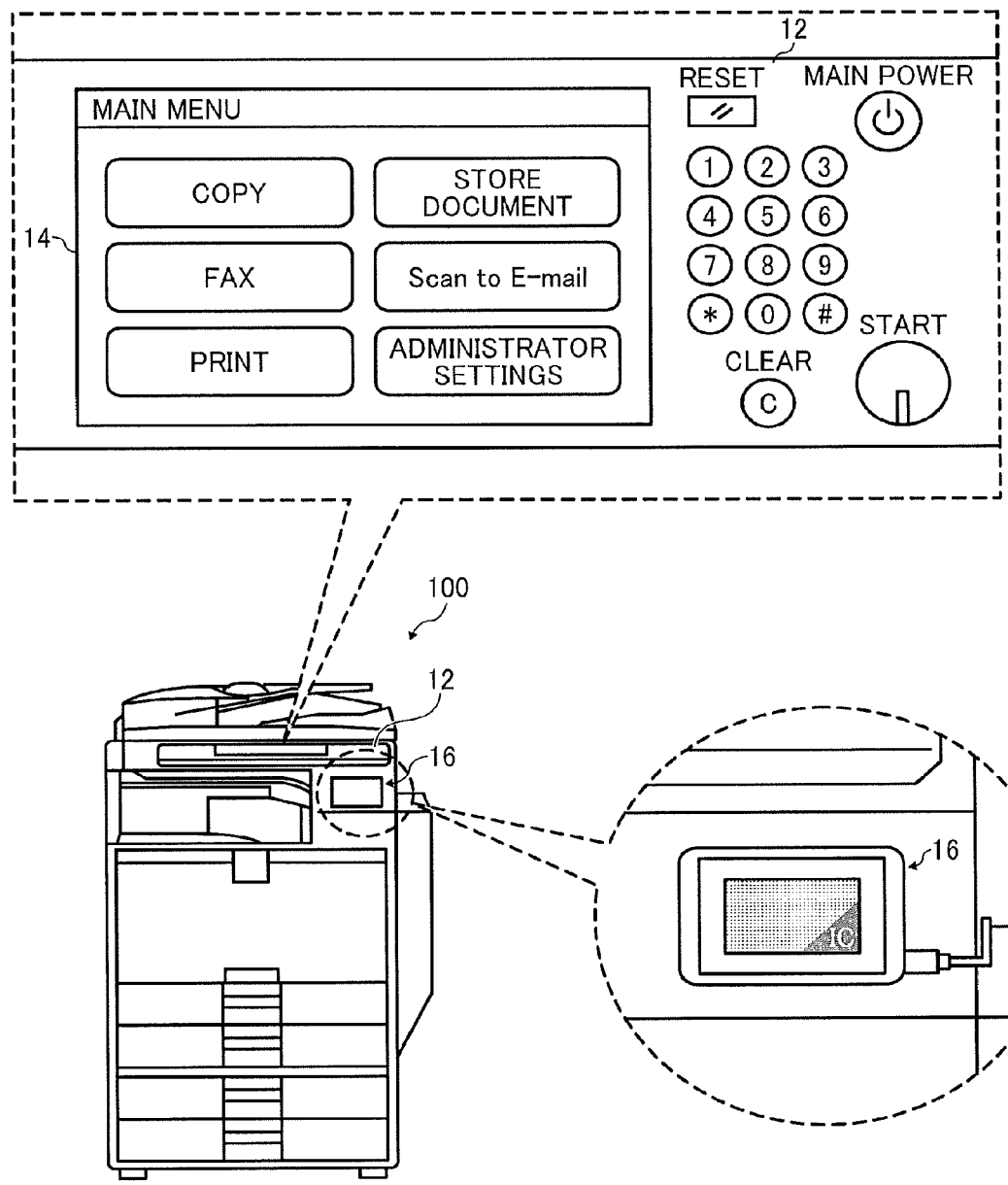
FIG. 1 is a diagram illustrating an external view of an image forming apparatus as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

FIG. 1 is a diagram illustrating an external view of an image forming apparatus 100 in this embodiment. In FIG. 1, a MFP is illustrated as an example of the image forming apparatus 100. Hereinafter, the image forming apparatus 100 is referred to as a MFP 100.

The MFP 100 in this embodiment is a network-based image forming apparatus with a control panel 12. As illustrated in FIG. 1, the control panel 12 of the MFP 100 includes a touch-panel display 14. On the display 14, menu buttons for selecting functions provided by the MFP 100 are displayed, and a desired function may be selected by touching these buttons by user operation.

Here, the MFP 100 in this embodiment includes a function that attaches a scanned image to e-mail and send the e-mail to another apparatus. Hereinafter, the function that attaches a scanned image to e-mail and send the e-mail is referred to as "scan to e-mail". As illustrated in FIG. 1, on the display 14, in addition to buttons for selecting standard functions such as copy, facsimile, and print etc., a button for selecting the "scan to e-mail" function is displayed.

Furthermore, as illustrated in FIG. 1, the MFP 100 includes an IC card reader 16. In this embodiment, a user may log in the MFP 100 automatically by holding a user's own IC card above the IC card reader 16.

Next, functional blocks of the image forming apparatus 100 in this embodiment are described below with reference to FIG. 2.

Figure 2:
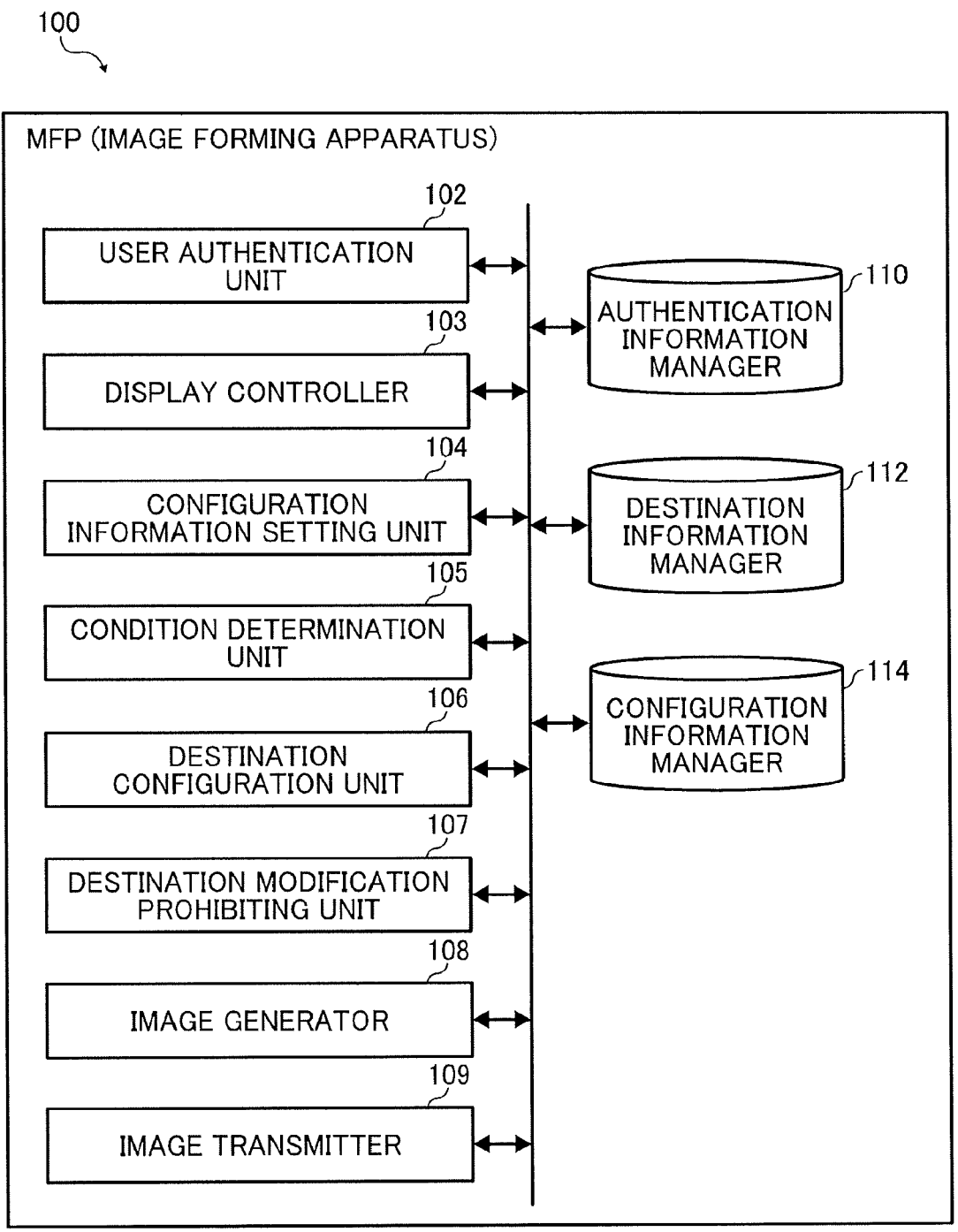
FIG. 2 is a diagram illustrating functional blocks of the image forming apparatus as an embodiment of the present invention.

As illustrated in FIG. 2, the MFP 100 in this embodiment includes a user authenticator unit 102, a display controller 103, a configuration information setting unit 104, a condition determination unit (a condition determining unit) 105, a destination configuration unit 106, a destination modification prohibiting unit 107, an image generator 108, an image transmitter 109, an authentication information manager 110, a destination information manager 112, and a configuration information manager 114.

The user authentication unit 102 authenticates a user who operates the MFP 100. In this embodiment, the user authentication unit 102 authenticates a user by comparing authentication information that the IC card reader 16 reads from the user's IC card with registration information registered in the authentication information manager 110. In other embodiments, the user authentication unit 101 may authenticate a user based on authentication information input by user operation.

The display controller 103 controls displaying a screen for setting a destination to which an image is sent on the display 14 of the control panel 12. The display controller 103 accepts configuring the destination to which the image is sent by user operation via a setting screen displayed on the display 14 and displays an operation result etc. on the display 14.

The configuration information setting unit 104 configures various settings by administrator operation to the MFP 100. The configuration information setting unit 104 provides a screen for inputting configuration information via the display controller 103 and stores the configuration information input by administrator operation via the screen in the configuration information management unit 114.

The condition determination unit 105 determines whether or not a destination configured by user operation satisfies a predetermined condition.

The destination configuration unit 106 automatically configures a destination of e-mail to which a scanned image is attached if the "scan to e-mail" function is selected by user operation. The destination configuration unit 106 reads an e-mail address preregistered by administrator operation among e-mail addresses registered in the destination information management unit 112 and configures the read e-mail address as a destination of the scanned image.

The destination modification prohibiting unit 107 prohibits to modify the destination configured by the destination configuration unit 106. The destination modification prohibiting unit 107 displays a screen on the display 14 via the display controller 103 so that the destination configured by the destination configuration unit 106 cannot be modified by user operation. Otherwise, if the destination configured by the destination configuration unit 106 is modified, the destination modification prohibiting unit 107 does not configure the modified destination as the destination of the image.

The image generator 108 generates an image scanned by a scanner included in the MFP 100 as image data in generic image formats such as JPEG, BMP, GIF, TIFF, and PDF etc. (hereinafter referred to as "image").

The image transmitter 109 transfers an image generated by the image generator 108 to the other apparatus via a network. In this embodiment, the image transmitter 109 transfers an image generated by the image generator 108 attached to e-mail to the other apparatus. In other embodiments, the image transmitter 109 may transfer an image file using an appropriate file transfer protocol such as FTP etc. to the other apparatus.

The functional configuration of the MFP 100 in this embodiment is described above. An administrator configuration of a "scan to e-mail" function in this embodiment is described below.

In this embodiment, an administrator configures the "scan to e-mail" function of the MFP 100 as described below. That is, the administrator configures whether or not it is required to set an e-mail address as a destination of e-mail to which an scanned image is attached (hereinafter, that may be referred to as "destination" or "address" simply in some cases). If it is required to automatically set the e-mail address, one or more automatically-set destinations are configured. In addition, the administrator configures whether or not to set conditions for automatically setting the destination. If there are conditions to be set, one or more conditions are configured. Furthermore, the administrator configures a condition for allowing modification of the set destination.

FIG. 3A is a diagram illustrating an administrator settings screen for configuring the "scan to e-mail" function. It should be noted that only the administrator can access the administrator settings screen 50. As illustrated in FIG. 3A, the administrator settings screen 50 includes four fields 52, 54, 56, and 58. Two radio buttons displayed in the field 52 allow the administrator to configure whether or not it is required to automatically set the destination. Three check boxes displayed in the field 54 allow the administrator to configure the destination to be automatically set. Two radio buttons displayed in the field 56 allow the administrator to configure whether or not conditions for automatically setting the destination should be set. The filed 56 further displays four check boxes for allowing the administrator to configure the conditions, if the conditions are to be set. In the field 58, three radio buttons are displayed for allowing the administrator to configure conditions for modifying destination.

The administrator selects each item displayed on the administrator settings screen 50. In response to that, the configuration information setting unit 104 generates configuration information of the "scan to e-mail" function illustrated in FIG. 3B (hereinafter referred to as "configuration information" simply) and stores the configuration information in the configuration information manager 114 (with reference to FIG. 2).

The administrator configuration of the "scan to e-mail" function in this embodiment is described above. An operation performed by the MFP 100 in displaying a job configuration screen is described below with reference to a flowchart illustrated in FIG. 4. In the below description, it should be noted that FIG. 2 is also referred as needed.

Figure 4:
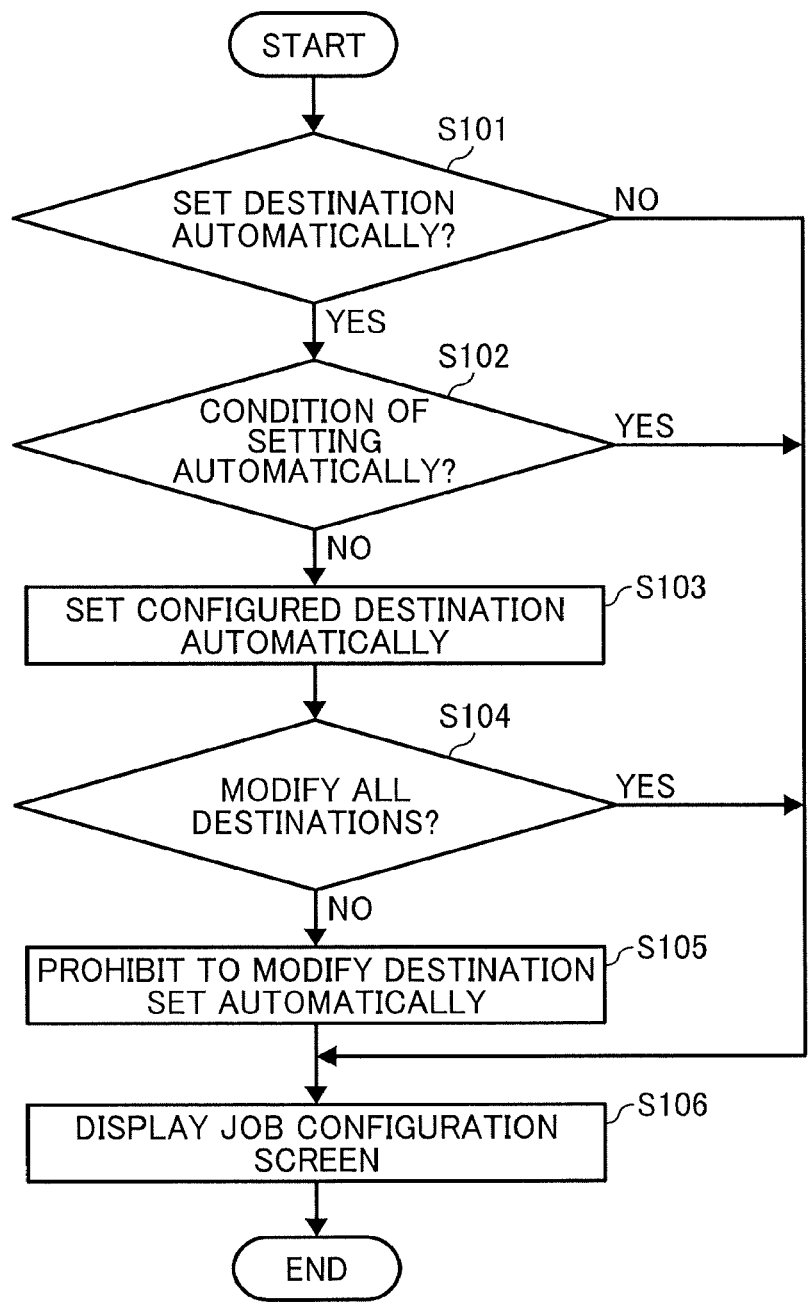
FIG. 4 is a flowchart illustrating an operation performed by the image forming apparatus as an embodiment of the present invention.

In response to selection of the "scan to e-mail" button on the display 14 being displayed, a processor (CPU) 20 (described later) included in a controller in the MFP 100 performs the operation illustrated in FIG. 4.

In S101, with reference to the configuration information stored in the configuration information manager 114, the processor (CPU) 20 determines whether or not it is required to set the destination automatically. As a result, if it is determined that it is not required to set the destination automatically (i.e., the setting is turned off), the operation proceeds to S106. After displaying the job configuration screen of the "scan to e-mail" function on the display 14, (hereinafter referred to as "a job configuration screen" simply), the operation ends.

By contrast, if it is determined that it is required to set the destination automatically (i.e., the setting is turned on), the operation proceeds to S102, and it is determined whether or not there are conditions for automatically setting the destination with reference to the configuration information. As a result, if it is determined that there are conditions for setting the destination automatically (i.e., the setting is turned on), the operation proceeds to S106. After displaying the job configuration screen on the display 14, the operation ends.

By contrast, if it is determined that there is no condition for setting the destination automatically (i.e., the setting is turned off), the operation proceeds to S103, and an address preset as the destination is set automatically. More specifically, with reference to the configuration information, among candidates for the destination set automatically "login user", "administrator", and "optional destination", an address that is set as valid (i.e., the setting is turned on) is read from the destination information manager 112 and configured.

Next, in S104, with reference to the configuration information, it is determined whether or not there are conditions for modifying destination. As a result, if it is determined that there are conditions for modifying all destinations (i.e., the setting is turned on), the operation proceeds to S106. After displaying the job configuration screen on the display 14, the operation ends.

By contrast, if either it is not allowed to modify all destinations or it is not allowed to modify the destination set automatically only (i.e., either one condition is turned on), the operation proceeds to S105, and it is prohibited to modify the address set automatically in S103 previously. Subsequently, the operation proceeds to S106. After displaying the job configuration screen on the display 14, the operation ends.

The operation performed by the MFP 100 in displaying the job configuration screen is described above. A result of the operation described above is described below specifically by contrast with the administrator settings screen 50 and the job configuration screen.

As illustrated in FIG. 5A, if the administrator selects "NO" button in the field 52 on the administrator settings screen 50 (the other fields 54, 56, and 58 become gray out in case of selecting the "NO" button"), a job configuration screen 70 illustrated in FIG. 5B is displayed on the display 14. In this case, on the job configuration screen 70, a text box 72 for inputting an address is displayed enabled to input text. As a result, a destination of the image may be configured by inputting a desired address in the text box 72 by user operation.

As illustrated in FIG. 6A, after the administrator selects "YES" button in the field 52 on the administrator settings screen 50 (the other fields 54, 56, and 58 return to normal status from the gray out status), if a check box "destination of login user" in the field 54 is checked, a button "set automatically always" in the field 56 is selected, and a button "all destination are modifiable" in the field 58 is selected, a job configuration screen 70 illustrated in FIG. 6B is displayed on the display 14. In this case, without waiting for user input, an address of the login user "user@x.co.jp" is displayed in the text box 72 on the job configuration screen 70. However, in this case, "all destinations are modifiable" is set to valid (ON) as the condition for modifying destination. Therefore, the user is allowed to modify the content of the text box 72 freely by user operation.

As illustrated in FIG. 7A, after the administrator selects "YES" button in the filed 52 on the administrator settings screen 50, if the check box "destination of login user" in the field 54 is checked, a button "set automatically always" in the field 56 is selected, and a button "all destinations are unmodifiable" in the field 58 is selected, a job configuration screen 70 illustrated in FIG. 7B is displayed on the display 14. In this case, without waiting for user input, an address of the login user "user@x.co.jp" is displayed in the text box 72 on the job configuration screen 70.

However, in this case, "all destinations are unmodifiable" is set to valid (ON) as the condition for modifying destination. Therefore, the text box 72 is displayed so that the text box 72 does not accept user operation. In this case, it is not allowed to input an address via the text box 72 by user operation. As a result, the destination is limited to the login user, and the information is prevented from being transferred to the other apparatus, preventing the information from being leaked.

In addition, in this case, the content in the text box 72 (i.e., login user address "user@x.co.jp") is displayed so that the content may be easily read. For example, the login user address may be displayed using gray out. However, the way of displaying the content is not limited to that case, and the content may be displayed in any other ways. Hereinafter, the way of displaying the content described above is referred to as "gray out" for sake of simplicity.

In other embodiments, if "all destinations are unmodifiable" is set to valid (ON), after accepting user operation on the text box 72, a new destination modified in the text box 72 may not be set to the destination of e-mail to which an image is attached (in this case, a job of sending e-mail becomes error).

As illustrated in FIG. 8A, after the administrator selects "YES" button in the field 52 on the administrator settings screen 50, if the check box "destination of administrator" in the field 54 is checked, a button "set automatically if condition below is satisfied" in the field 56 is selected, a check box "if destination outside corporation is included" is selected, and a button "only destination set automatically is unmodifiable" in the filed 58 is selected, the job configuration screen 70 illustrated in FIG. 8B is displayed on the display 14. In this case, on the job configuration screen 70, a text box 72 is displayed enabled to input text, and any desired address may be input in the text box 72 by user operation. Subsequently, if any desired address is input in the text box 72 by user operation, based on the fact whether or not the input address satisfies a condition, the MFP 100 determines if the configured address is added automatically. (The operation is described later in detail.)

The operation performed by the MFP 100 in displaying the job configuration screen for the "scan to e-mail" function is described above. An operation performed by the MFP 100 if the destination on the job configuration screen for the "scan to e-mail" function is edited by user operation is described below with reference to a flowchart illustrated in FIG. 9.

Figure 9:
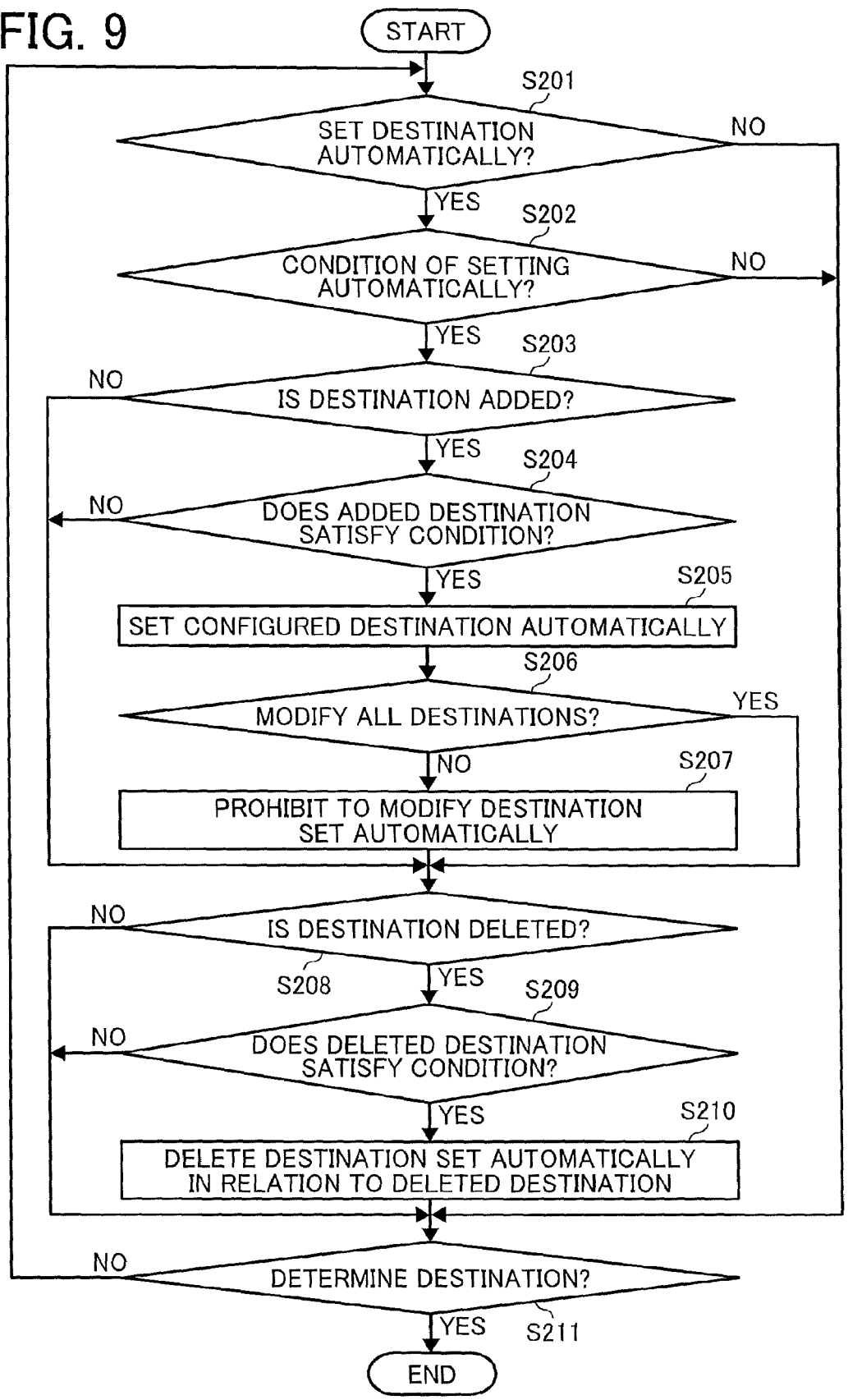
FIG. 9 is a flowchart illustrating an operation performed by the image forming apparatus as an embodiment of the present invention.

In response to user operation that edits the destination on the job configuration screen for the "scan to e-mail" function, the processor (CPU) 20 (described later) included in the controller in the MFP 100 performs the operation illustrated in FIG. 9. Regarding a configuration of the condition modifying destination, if the condition "all destination are unmodifiable" is set to valid (ON), it is prohibited to edit the destination by user operation thoroughly, and the operation described below is not performed.

In S201, with reference to the configuration information, it is determined whether or not it is required to set the destination automatically. As a result, if "set destination automatically" is set to "NO" (OFF), the operation proceeds to S211. By contrast, if "set destination automatically" is set to "YES" (ON), the operation proceeds to S202, and it is determined whether or not there are conditions for setting the destination automatically with reference to the configuration information. As a result, if the condition for setting destination automatically is set to nothing (OFF), the operation proceeds to S211.

By contrast, in S202, if there is the condition for setting destination automatically (ON), the operation proceeds to S203, and it is determined whether or not an address is added to the text box 72 on the job configuration screen. As a result, if no address is added (NO in S203), the operation proceeds to S208. By contrast, if an address is added (YES in S203), the operation proceeds to S204, it is determined whether or not the added address satisfies the set condition for setting automatically with reference to the configuration information.

As a result, if the added address does not satisfy the condition (NO in S204), the operation proceeds to S208. By contrast, if the added address satisfies the condition (YES in S204), the operation proceeds to S205, in addition to the address input by user operation, an address preset as a destination of e-mail to which a scanned image is attached is set automatically. More specifically, with reference to the configuration information, among candidates for the destination set automatically "login user", "administrator", and "optional destination", an address that is configured as valid (i.e., the setting is turned on) is read from the destination information manager 112 and configured.

Next, in S206, with reference to the configuration information, it is determined whether or not there are conditions for modifying destination. As a result, if it is determined that there are conditions for modifying all destinations (i.e., the setting is turned on), the operation proceeds to S208. By contrast, if "only destination set automatically is unmodifiable" is set to valid (ON), the operation proceeds to S207. After prohibiting to modify the address configured automatically in S205, the operation proceeds to S208.

In S208, it is determined whether or not the address input in the text box 72 on the job configuration screen is deleted. As a result, if no address is deleted (NO in S208), the operation proceeds to S211. By contrast, if an address is deleted (YES in S208), the operation proceeds to S209, it is determined whether or not the deleted address satisfies the set condition for setting automatically with reference to the configuration information.

As a result, if the deleted address does not satisfy the condition (NO in S209), the operation proceeds to S211. By contrast, if the deleted address satisfies the condition (YES in S209), the operation proceeds to S210. In association with the deleted address by user operation, after deleting the address set automatically previously, the operation proceeds to S211.

In S211, it is determined whether or not the destination of the e-mail to which the scanned image is attached is fixed. The determination may be performed based on user event such as closing the job configuration screen and pressing the start button on the control panel 12 etc. After the determination in S211, if the destination is fixed (YES in S211), the operation ends as is. By contrast, if the destination is not fixed (NO in S211), the step goes back to S201, and the operation described above is repeated.

The operation performed by the MFP 100 in case of editing the destination on the job configuration screen for the "scan to e-mail" function by user operation is described above. A result of the operation described above is described below specifically.

Figure 10A:
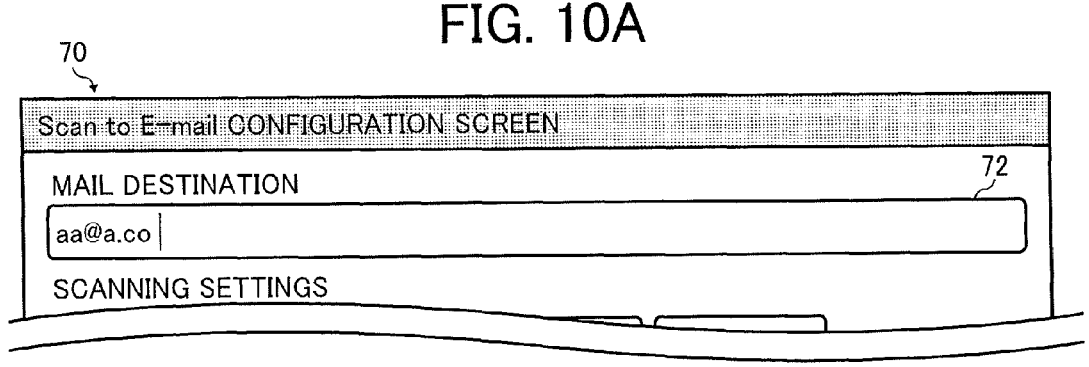
FIGS. 10A, 10B, 10C, 10D, and 10E are diagrams illustrating a job configuration screen as an embodiment of the present invention.

If the administrator configures the administrator settings screen 50 as illustrated in FIG. 8A, in response to the job configuration screen 70 in FIG. 8B (including the text box 72 that text may be input by user operation) being displayed, it is assumed that an address outside the corporation is input in the text box 72 by user operation as illustrated in FIG. 10A.

Figure 10B:
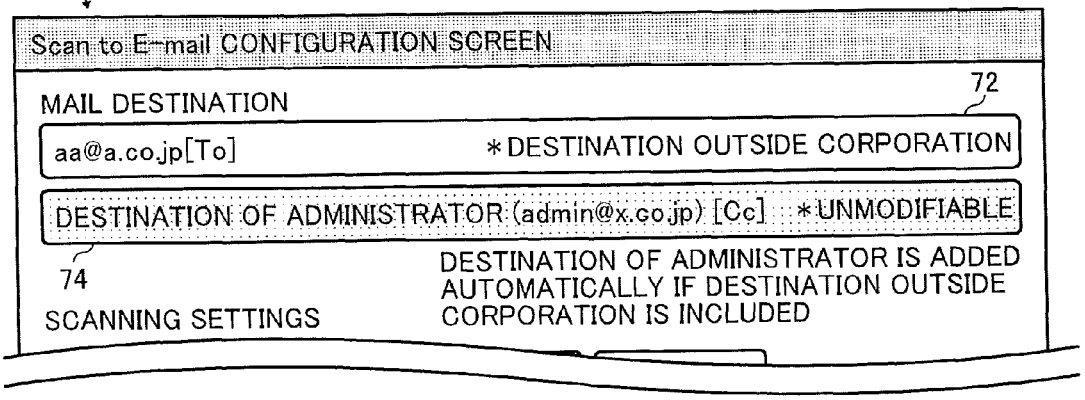

In this case, the check box "destination of administrator" is selected as the destination set automatically, and "if destination outside corporation is included" is selected as the condition of setting automatically. Therefore, as illustrated in FIG. 10B, on the job configuration screen, a new text box 74 that displays the administrator address "admin@x.co.jp" is displayed. However, in this case, "only destination set automatically is unmodifiable" is set to valid (ON) as the condition for modifying destination. Therefore, the text box 74 displays the administrator address "admin@x.co.jp" so that the administrator address becomes gray out. As a result, it is impossible to delete the administrator address "admin@x.co.jp" displayed in the text box 74 by user operation.

That is, in this case, if an image is transferred to outside the corporation by user operation, the image is also sent to the administrator. Consequently, the administrator can detect that the information is transferred to outside the corporation. In addition, by displaying the administrator address in the text box 74 so that the administrator address may be read easily, the user may be noticed that the image is sent to the administrator, deterring users from leaking information.

In other embodiments, in this case, after accepting user operation on the text box 74, a new destination modified in the text box 72 may not be set to the destination of e-mail to which an image is attached (in this case, a job of sending e-mail becomes error).

Figure 10C:
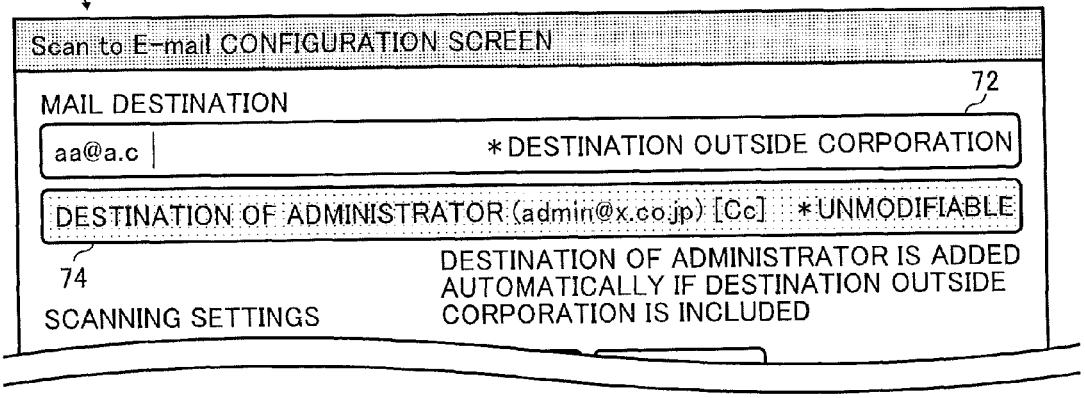
Figure 10D:
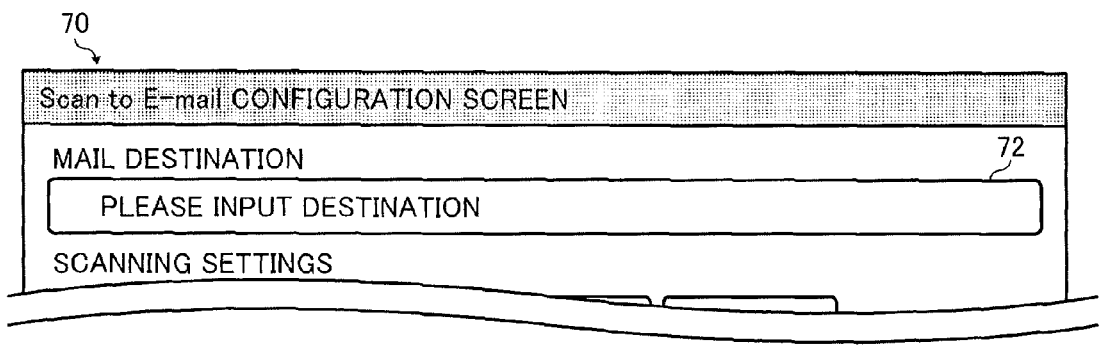
Figure 10E:
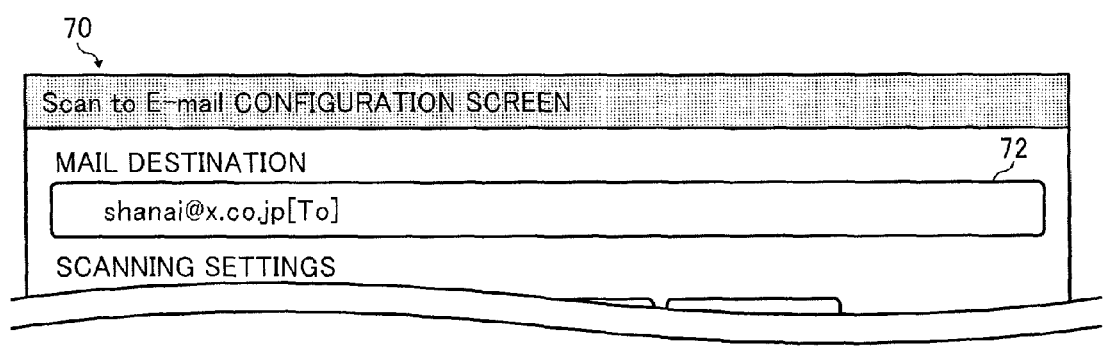

For example, in response to displaying of the administrator address "admin@x.co.jp" in the text box 74, if an address outside corporation "aa@a.co.jp" is deleted by user operation as illustrated in FIG. 10C, in response to that, as illustrated in FIG. 10D, the text box 74 that displays the administrator address "admin@x.co.jp" is deleted. Furthermore, if an address inside corporation "shanai@x.co.jp" is input in the text box 72 by user operation, the newly input address "shanai@x.co.jp" does not satisfy the configured condition of setting automatically (i.e., the address is not the address outside the corporation). As a result, the administrator address is not set as the destination, and the text box 74 is not displayed on the job configuration screen.

As described above, in this embodiment, the administrator destination may be added only if the predetermined condition is satisfied. As a result, the number of images sent to the administrator may be reduced, alleviating a burden on the administrator.

Lastly, a hardware configuration of the MFP 100 in this embodiment is described below with reference to a diagram illustrating a hardware configuration in FIG. 11.

Figure 11:
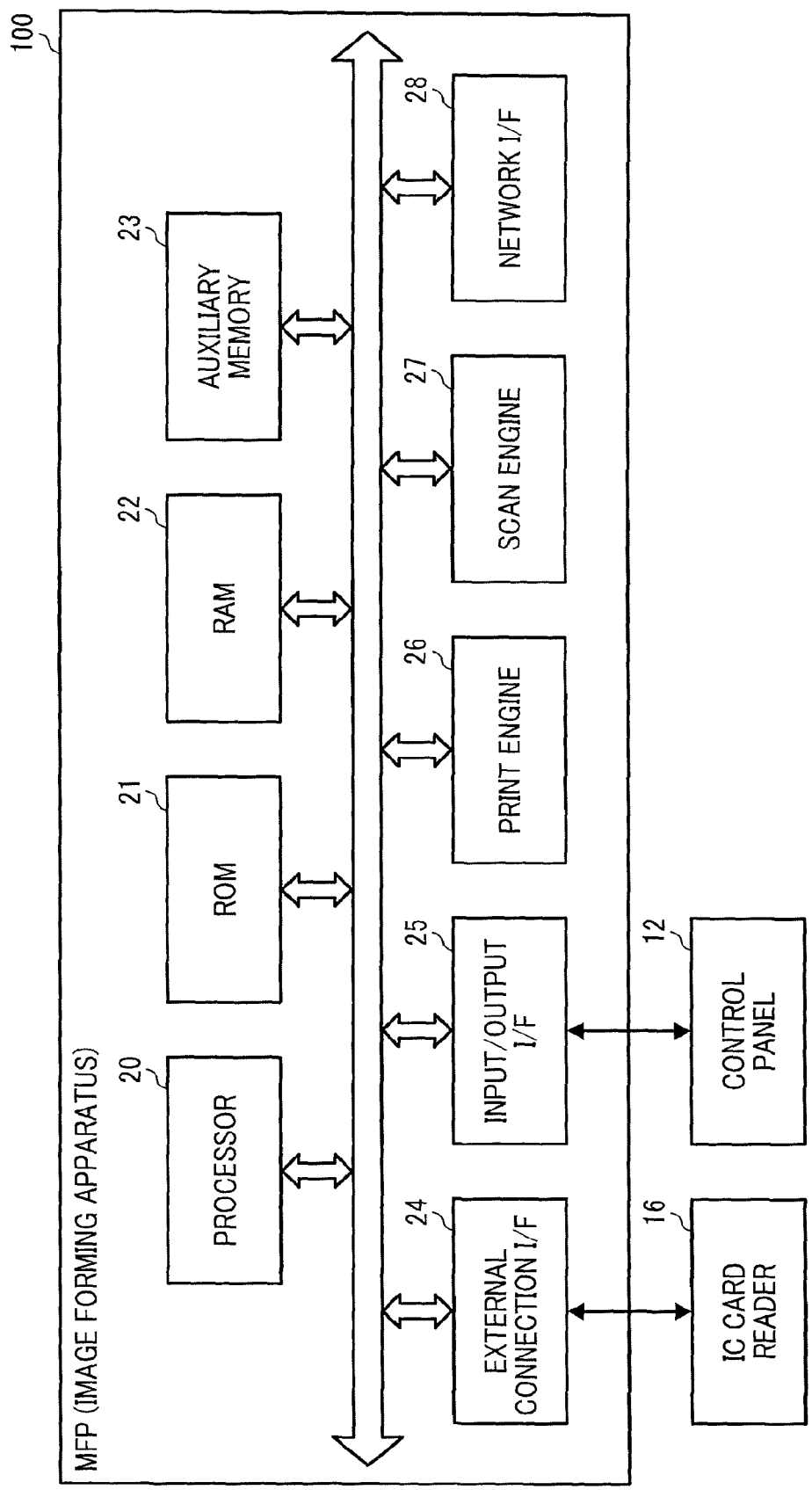
FIG. 11 is a diagram illustrating a hardware configuration of an image forming apparatus as an embodiment of the present invention.

As illustrated in FIG. 11, a controller (computer) in the image forming apparatus 100 at least includes a processor (CPU) 20 that controls the entire apparatus to perform the operations described above by executing programs, a ROM 21 that stores a boot program and a firmware program etc., a RAM 22 that provides an area for executing a program, an auxiliary storage device 23 that stores an operating system (OS) and various application programs etc., an external connection interface 24 that connects external input/output devices such as the IC card reader 16 etc., an input/output interface 25 that connects the control panel 12 etc., a print engine 26 that executes a printing process, a scan engine 27 that executes a scanning process, and a network interface 28 that connects to a network.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

In the embodiments described above, a novel image forming apparatus that may reduce a burden on the administrator and deterring users from transferring information to the other apparatus is provided.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus, comprising:
   a memory to store configuration information indicating one or more conditions for automatically setting a preregistered destination as a transmission destination of image data; and
   circuitry to, in response to receiving a user instruction for transmitting the image data to a destination configured by a user,
   determine whether or not the configured destination satisfies at least one of the conditions indicated by the configuration information, and
   configure the preregistered destination as the transmission destination of the image data in addition to the configured destination based on a determination indicating that the configured destination satisfies the at least one of the conditions, the preregistered destination being suppressed by destination modification prohibition circuitry from modification by the user based on a setting of a condition for modifying the transmission destination; and
   a transmitter to transmit the image data to the configured destination and the preregistered destination.

2. The image processing apparatus according to claim 1, further comprising:
   a display to display a screen that allows the user to configure the destination to which the image data is transferred, the screen including the preregistered destination that is configured by the image processing apparatus.

3. The image processing apparatus according to claim 2, wherein the preregistered destination displayed on the screen is not modifiable by the user.

4. The image processing apparatus according to claim 1, wherein the circuitry is further configured to determine whether the at least one of the conditions indicated by the configuration information is deleted from the memory, and delete the configured preregistered destination based on a determination indicating that the at least one of the conditions indicated by the configuration information is deleted.

5. The image processing apparatus according to claim 1, wherein the preregistered destination is a destination of an administrator.

6. The image processing apparatus according to claim 1, further comprising:
   a scanner to scan an original image into the image data to be transmitted to the transmission destination.

7. A method of controlling an image processing apparatus, the method comprising:
   storing, in a memory, configuration information indicating one or more conditions for automatically setting a preregistered destination as a transmission destination of image data;
   determining whether or not the configured destination satisfies at least one of the conditions indicated by the configuration information, in response to receiving a user instruction for transmitting the image data to a destination configured by a user;
   configuring the preregistered destination as the transmission destination of the image data in addition to the configured destination based on a determination indicating that the configured destination satisfies the at least one of the conditions, the preregistered destination being suppressed by destination modification prohibition circuitry from modification by the user based on a setting, of a condition for modifying the transmission destination; and transmitting the image data to the configured destination and the preregistered destination.

8. The method of controlling the image processing apparatus according to claim 7, the method further comprising:
displaying a screen that allows the user to configure the destination to which the image data is transferred, the screen including the preregistered destination that is configured by the image processing apparatus.

9. The method of controlling the image processing apparatus according to claim 7, the method further comprising:
determining whether the at least one of the conditions indicated by the configuration information is deleted from the memory; and
deleting the configured preregistered destination based on a determination indicating that the at least one of the conditions indicated by the configuration information is deleted.

10. The method of controlling an image forming apparatus according to claim 7, wherein the preregistered destination is a destination of an administrator.

11. A non-transitory, computer-readable recording medium storing a program that, when executed by one or more processors, causes the processors to implement a method of controlling an image processing apparatus, the method comprising:
storing, in a memory, configuration information indicating one or more conditions for automatically setting a preregistered destination as a transmission destination of image data;
determining whether or not the configured destination satisfies at least one of the conditions indicated by the configuration information, in response to receiving a user instruction for transmitting the image data to a destination configured by a user;
configuring the preregistered destination as the transmission destination of the image data in addition to the configured destination based on a determination indicating that the configured destination satisfies the at least one of the conditions, the preregistered destination being suppressed by destination modification prohibition circuitry from modification by the user based on a setting of a condition for modifying the transmission destination; and
transmitting the image data to the configured destination and the preregistered destination.

\* \* \* \* \*